Patented Nov. 30, 1937

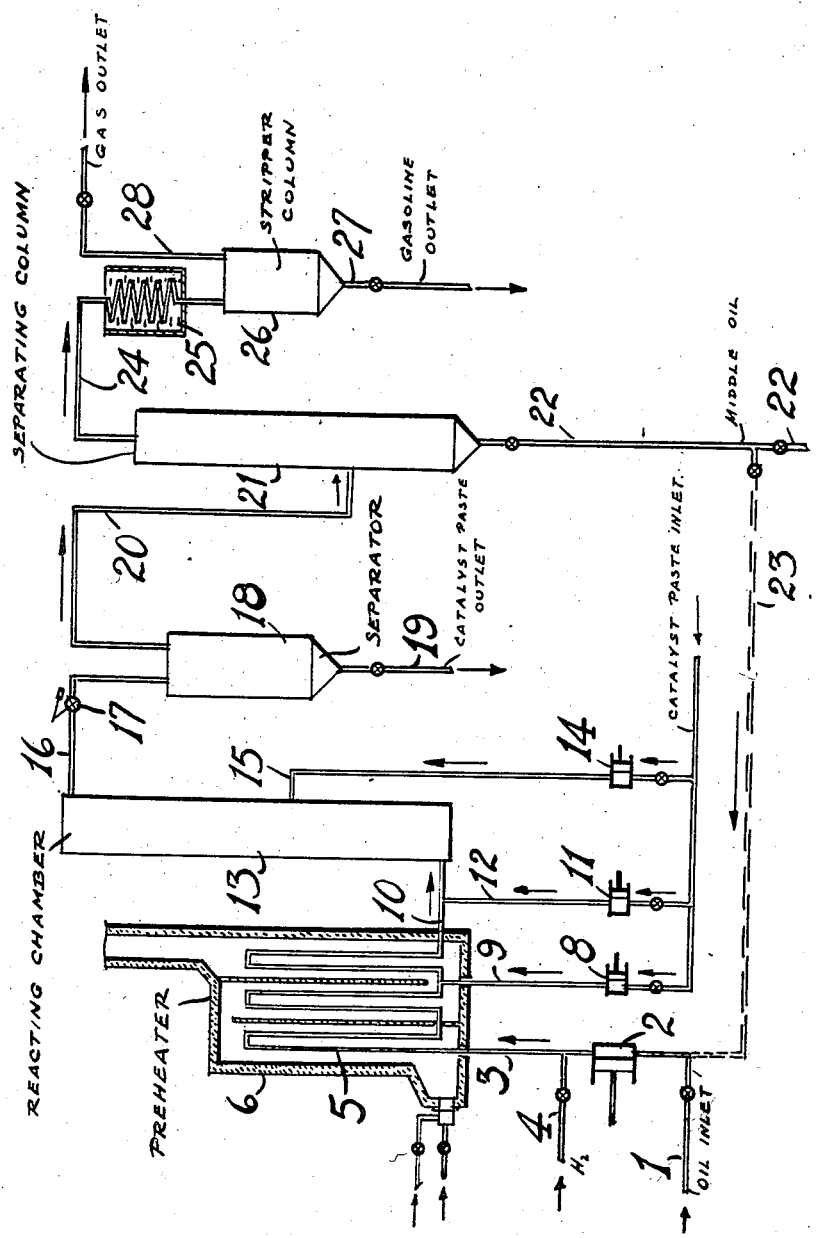

2,100,354

UNITED STATES PATENT OFFICE 2,100,354

TREATMENT WITH HYDROGENATING GASES OF DISTILLABLE CARBONACEOUS MATERIALS

Mathias Pier, Heidelberg, and Walter Simon and Georg Grassl, Ludwigshafen-on-the-Rhine, Germany, assignors to Standard-I. G. Company, Linden, N. J., a corporation of Delaware Application March 9, 1935, Serial No. 10,336
In Germany March 10, 1934

1 Claim. (Cl. 196—53)

The present invention relates to improvements in the treatment with hydrogenation gases of distillable carbonaceous materials.

It is known to work in the treatment with hydrogenating gases of distillable carbonaceous material, such as coal, tars, mineral oils, their distillation products, extraction products and the like, for the production of valuable, in particular low boiling hydrocarbons in the presence of halogen or halogen compounds as catalysts.

We have now found, that the yields of valuable hydrocarbons and/or the properties of the products obtained are appreciably improved if, when using halogens, hydrogen halides or such halogen compounds, which under the reaction conditions are able to split off halogen or hydrogen halide, in particular halogen compounds of non-metals, as for example organic halogen compounds, there is worked in the presence of fine-granular, e. g. pulverulent free metals, which are preferably finely distributed in the materials to be treated. The halogens, hydrogen halides and the halogen compounds of non-metals capable of splitting off halogen or hydrogen halides under the working conditions are referred to as non-metallic substances comprising free halogen or hydrogen halide.

For instance, in the treatment of coal the conversion is increased and the asphalt content of the final products is reduced as compared with working with halogen alone, without application of finely distributed metal.

A further advantage of the process consists in that the amount of halogens, hydrogen halides or halogen compounds, which under the reaction conditions are able to split off halogen or hydrogen halide, to be apped as a catalyst can be reduced considerably, say to one third, as compared with working with the said halogen and halogen compounds alone, without impairing the catalytic action, which renders it possible to preserve the material of the apparatus very appreciably and to use less expensive materials for the construction of the apparatus. When using metals from groups 2 to 4 of the periodic system the amount of halogen may be still further reduced.

As comminuted, in particular finely distributed metals are advantageously used, iron, nickel or cobalt, further zinc, aluminium, tin, lead, cadmium, chromium, rhenium, germanium, manganese, titanium, silver, copper, magnesium, beryllium and the like or metal alloys, such as bronze, brass, magnalium, aluminium bronze and the like, preferably in the form of powder. The metal may also be applied in a finely distributed state on carriers, such as brown coal small coke, active silica and the like, and these carriers introduced into the apparatus in a fine-granular or pulverulent state. The metals may also be added in the form of finely divided, readily reducible compounds, and these reduced to metals before the start of the reaction. For instance, coal in the form of dust may be thoroughly mixed with iron oxide and the latter reduced to metal by passing over a stream of hydrogen at temperatures below the decomposition temperature of the coal. Of the halogens, besides bromine and iodine, mainly chlorine comes into consideration. Besides the corresponding hydrogen halides such halogen compounds as contain carbon and hydrogen may more particularly be employed for example, chloroform, iodoform, bromoform, the chlorine, bromine or iodine compounds of benzene, as also methylene-, ethylene chloride and the like, further such inorganic halogen compounds, as e. g. ammonium chloride, which under the conditions of the reaction give off halogen or hydrogen halide. Sometimes it may be of advantage to add the halogen in adsorbed state, for instance adsorbed in finely porous substances. Coal or other carbonaceous compounds, such as oils and the like, may also be pretreated with halogen and the substances pretreated in this manner, containing the halogen in a combined and adsorbed or dissolved state, added to the initial materials.

The hydrogen halides may be added to the initial materials to be treated in gaseous or vaporous or dissolved state, for example, dissolved inorganic solvents, such as oils.

The catalysts may be added before, after or during the preheating of the initial materials. It has proved thereby to be suitable to add the halogen only after the metal is already present. If the coal to be destructively hydrogenated contains in its ash sufficient amounts of readily reducible oxides, such as iron oxide, namely at least 0.5 per cent of said oxides, then the coal is subjected to a reducing treatment before the destructive hydrogenation. In this case the addition of further amounts of metal is under certain conditions superfluous.

The amount of halogen and metal to be added in the reaction suitably amounts for each between 0.01 and 10 per cent calculated on the initial material used, although the amount of the halogens is in many cases not above 2 per cent of the weight of the materials to be treated. When working with free hydrogen halide the amounts are preferably taken less than 2 per cent, more particularly less than 1 per cent, calculated on the materials to be treated, since a disadvantageous polymerizing action of the hydrogen halide, in particular of hydrogen chloride which otherwise may sometimes occur, is practically avoided when these mixing proportions are adhered to.

When carrying out the present process other hydrogenation catalysts may also be applied, for instance compounds of metals of the 6th group of the periodic system or organic tin compounds, either with or without carriers.

The expression "treatment with hydrogenating gases of distillable carbonaceous materials" when employed in the present application is intended to comprise the most various reactions. Thus the expression includes the destructive hydrogenation of carbonaceous materials, such as coal of all varieties, including lignite, other solid carbonaceous materials, such as peat, shales and wood, mineral oils, tars and the distillation, conversion and extraction products thereof. The said destructive hydrogenation may be used to produce hydrocarbons of all sorts, such as motor fuels and in particular anti-knock motor fuels, solvent naphthas, middle oils, kerosene and lubricating oils.

The said reactions with hydrogen or hydrogen containing gases are usually carried out at temperatures between 200° and 700° C., preferably above 250° C., and as a rule between about 360° and 550° C. The pressures employed are usually in excess of 20 atmospheres and as a rule preferably in excess of 50 atmospheres. In some reactions, however, atmospheric pressure or pressures slightly above atmospheric may be employed. Generally however pressures of about 100, 200, 300, 500 and in some cases even 1000 atmospheres come into question.

The amount of hydrogen maintained in the reaction space and parts connected therewith, if any, varies greatly with the nature of the particular initial materials treated or according to the result in view. In general 300, 600, 1000, 2000 cubic meters or more of hydrogen, measured under normal conditions of temperature and pressure, per ton of carbonaceous material treated may be used. The smallest amount of hydrogen employed per ton of carbonaceous material will be about 100 cubic meters of hydrogen and amounts of up to about 3000, 4000 cubic meters or more may be employed in many cases.

The temperature, pressure and amount of hydrogen best adapted for any particular modification of the process are well-known to those skilled in the art.

The accompanying drawing shows a diagrammatic sketch of suitable equipment for carrying out the invention. Referring to the drawing, the distillable carbonaceous material to be treated, such as an oil, is fed into line 1 through pump 2 and thence into line 3, into which hydrogen is also fed through line 4 and the mixture passes through the heating coil 5 located in a gas fired preheating furnace 6. After the oil-hydrogen mixture has been heated close to a reaction temperature in the first part of the heating coil 5, some of the catalyst paste coming from feed line 7 is charged by means of pump 8 through line 9 into the heating coil 5 to prevent coking in the outlet portion of said coil. The resulting preheated mixture emerges from the furnace 6 through line 10 and after receiving an additional charge of catalyst paste by means of pump 11 and line 12, it is fed into the inlet end of the reaction chamber 13. An additional supply of catalyst paste is charged by means of pump 14 through line 15 into the middle portion of the reaction chamber 13, from which the reaction products are withdrawn through line 16 and a reducing valve 17 into separator 18, from which the high boiling constituents and catalyst may be discharged through line 19, while the lighter constituents are carried over through line 20 into the separating column 21, from which a middle oil fraction may be withdrawn at the bottom through line 22 and either used as such or recycled through line 23 into original oil feed line 1, while the volatile constituents are taken off from the top of separating column 21 through line 24 and condenser 25 into the stripper 26 from which a liquid naphtha or gasoline product is withdrawn from the bottom through line 27 while the gas which is withdrawn from the top through line 28 may be passed through suitable equipment not shown for removing any residual gasoline vapors contained in the gas.

The following examples will further illustrate the nature of the invention, but it should be understood that the invention is not limited to said examples.

*Example 1*

A bituminous coal freed from ash is made into a paste with a heavy oil obtained by destructive hydrogenation of the same coal, in the proportion of 1:1. Then 2 per cent of zinc dust (calculated on coal) and 0.75 per cent (calculated on coal) of chlorine in the form of carbon tetrachloride or ammonium chloride are added to the coal paste thus obtained. The mixture is then heated together with hydrogen to 425° C. at a pressure of 250 atmospheres in a gas-heated preheater and passed in liquid state continuously through an adjacent reaction chamber. In this manner 93 per cent of the coal substance is converted mainly into liquid products containing 2 per cent of asphalt and consisting to the extent of up to 75 per cent of components boiling up to 325° C.

*Example 2*

A brown coal freed from ash is soaked with ammonium molybdate in such a manner that 0.2 per cent of molybdic acid is present in the coal, and made into a paste with a heavy oil obtained by destructive hydrogenation of the same coal in the proportion 1:1. Then 0.1 per cent of aluminium bronze and 0.75 per cent of chlorine (both calculated on coal) in the form of carbon tetrachloride are added to the coal paste. The coal paste is placed in a pressure vessel of 5 liters capacity, rotating around its longitudinal axis. Such a quantity of hydrogen is forced in that an initial pressure of 110 atmospheres results. The pressure vessel is heated within three hours to 390° C. and kept at this temperature for three more hours. A maximum pressure of 250 atmospheres results thereby. 97 per cent of the coal substance is converted into mainly liquid products containing 4 per cent of asphalt.

If the same reaction is effected without the addition of aluminium bronze, then the conversion of the coal amounts to 94 per cent, whilst the liquid products contain 12 per cent of asphalt.

*Example 3*

Bituminous coal freed from ash is soaked with a solution of ammonium molybdate to which a small quantity of a wetting agent is added, in such a manner that 0.02 per cent of molybdic acid is present in the coal. The coal is then made into a paste with a heavy coal oil in the proportion 1:1 and heated to 455° C. together with hydrogen under a pressure of 250 atmospheres. After the preheating 0.2 per cent of finely ground iron and 0.25 per cent (both calculated on coal) of chlorine in the form of carbon tetrachloride are added to the coal paste. The coal paste then comes in a liquid state into a reaction vessel. With this procedure the conversion of the coal amounts to 96.5 per cent and the liquid products consist to the extent of 97 per cent of gasoline and middle oil.

If the reaction is effected without the addition of iron, then it is necessary to use at least 0.75 per cent of chlorine in the form of carbon tetrachloride in order to achieve approximately the result mentioned.

Example 4

A heavy oil obtained by destructive hydrogenation of bituminous coal which contains 3 per cent of components boiling up to 325° C. and 10 per cent of asphalt is brought into a rotating pressure vessel together with 2 per cent of molybdic acid, 0.2 per cent of aluminium bronze and 0.25 per cent of chlorine in the form of chlorobenzene. The initial hydrogen pressure amounts to 110 atmospheres. The pressure vessel is then heated within three hours to 450° C. and maintained for two hours at this temperature, whereby the reacting material is in the liquid phase. The maximum pressure amounts to 220 atmospheres. The liquid reaction products consist to the extent of 18.5 per cent of components boiling up to 250° C. and for 60 per cent of components boiling up to 325° C., and contain 4 per cent of asphalt.

If no aluminium bronze is added and when applying 0.75 per cent of chlorine in the form of chlorobenzene under otherwise like reaction conditions, a liquid product is obtained containing 8 per cent of components boiling below 250° C. and 48 per cent boiling below 325° C. The asphalt content amounts to 4 per cent.

Example 5

A bituminous coal freed from ash is made into a paste with a heavy oil obtained by destructive hydrogenation of the same coal in the proportion 1:1. Then 1 per cent of zinc dust (calculated on coal) is added to the coal paste. The coal paste is then brought into a pressure vessel rotating about its longitudinal axis. 0.6 per cent of hydrogen chloride (calculated on coal) is then led into the closed vessel and subsequently so much hydrogen is pressed in that an initial pressure of 100 atmospheres results. The vessel is then heated to 425° C. within three hours and kept at that temperature for three more hours. The maximum pressure obtained amounts to about 250 atmospheres. Hereby 97 per cent of the coal substance is converted into substantially liquid products containing 4 per cent of asphalts.

What we claim is:

A process for the treatment of distillable carbonaceous materials with added hydrogen or an added gas containing free hydrogen at an elevated temperature between 200° and 700° C. and a pressure in excess of 20 atmospheres, having at least 100 cubic meters of hydrogen present per ton of carbonaceous material treated, which comprises effecting said treatment in the presence as a catalyst of a fine granular free metal selected from the group consisting of aluminum, magnalium and aluminum bronze, finely distributed in the carbonaceous material treated, and between 0.01 and 1% with reference to the amount of the said carbonaceous material of a non-metallic substance comprising free halogen or hydrogen halide, the halogen portion of said non-metallic substance being selected from the group consisting of chlorine and bromine.

MATHIAS PIER.
WALTER SIMON.
GEORG GRASSL.